United States Patent
Wei et al.

(10) Patent No.: US 12,370,963 B2
(45) Date of Patent: Jul. 29, 2025

(54) SYSTEM ARCHITECTURE FOR REFUSE VEHICLE

(71) Applicant: Oshkosh Corporation, Oshkosh, WI (US)

(72) Inventors: Zhenyi Wei, Oshkosh, WI (US); Brian Thomas, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 272 days.

(21) Appl. No.: 18/143,174

(22) Filed: May 4, 2023

(65) Prior Publication Data
US 2023/0356674 A1 Nov. 9, 2023

Related U.S. Application Data

(60) Provisional application No. 63/339,166, filed on May 6, 2022.

(51) Int. Cl.
*B60R 16/023* (2006.01)
(52) U.S. Cl.
CPC ................................ *B60R 16/0231* (2013.01)
(58) Field of Classification Search
CPC .................................................. B60R 16/0231
See application file for complete search history.

(56) References Cited

U.S. PATENT DOCUMENTS

2017/0361491 A1   12/2017  Datema et al.
2018/0327183 A1*  11/2018  Peek ......................... E01H 5/061
2019/0121353 A1    4/2019  Datema et al.
2019/0325220 A1   10/2019  Wildgrube et al.
2019/0344475 A1   11/2019  Datema et al.
2020/0078986 A1    3/2020  Clifton et al.
2020/0230841 A1    7/2020  Datema et al.
2020/0230842 A1    7/2020  Datema et al.
2020/0265656 A1    8/2020  Koga et al.
(Continued)

FOREIGN PATENT DOCUMENTS

CN   207644319 U    7/2018
CN   214900908 U   11/2021

OTHER PUBLICATIONS

Office Action issued in connection with Canadian Appl. No. 3198979 dated Sep. 10, 2024.

*Primary Examiner* — Behrang Badii
(74) *Attorney, Agent, or Firm* — Foley & Lardner LLP

(57) ABSTRACT

A refuse vehicle includes a first controller area network (CAN) bus for body functions of the refuse vehicle. The refuse vehicle also includes multiple controllable elements of a body of the refuse vehicle communicably coupled with the first CAN bus. The refuse vehicle includes a second CAN bus for chassis functions of the refuse vehicle. The refuse vehicle includes multiple controllable elements of a chassis of the refuse vehicle communicably coupled with the second CAN bus. The refuse vehicle includes a telematics module communicably coupled with both the first CAN bus and the second CAN bus. The telematics module is configured to monitor communications on both the first CAN bus and the second CAN bus and transmit the communications to a cloud computing system. The first CAN bus and the second CAN bus are communicatively separate and do not communicate with each other directly.

20 Claims, 4 Drawing Sheets

(56) References Cited

U.S. PATENT DOCUMENTS

| | | |
|---|---|---|
| 2020/0346657 A1 | 11/2020 | Clifton et al. |
| 2020/0398857 A1 | 12/2020 | Clifton et al. |
| 2020/0401807 A1 | 12/2020 | Wildgrube et al. |
| 2020/0402325 A1 | 12/2020 | Koga et al. |
| 2021/0124347 A1 | 4/2021 | Datema et al. |
| 2021/0162630 A1 | 6/2021 | Clifton et al. |
| 2021/0225095 A1 | 7/2021 | Koga et al. |
| 2021/0229320 A1 | 7/2021 | Datema et al. |
| 2021/0271884 A1 | 9/2021 | Wildgrube et al. |
| 2021/0316740 A1 | 10/2021 | Clifton et al. |
| 2021/0316741 A1 | 10/2021 | Clifton et al. |
| 2021/0345062 A1 | 11/2021 | Koga et al. |
| 2021/0394394 A1 | 12/2021 | Datema et al. |
| 2021/0407222 A1 | 12/2021 | Koga et al. |
| 2022/0009338 A1* | 1/2022 | Yakes .................. B60L 58/12 |
| 2022/0097527 A1 | 3/2022 | Koga et al. |
| 2022/0097961 A1 | 3/2022 | Koga et al. |
| 2022/0097964 A1 | 3/2022 | Koga et al. |
| 2022/0185582 A1 | 6/2022 | Koga et al. |
| 2022/0332014 A1 | 10/2022 | Datema et al. |
| 2022/0388198 A1 | 12/2022 | Datema et al. |
| 2023/0023747 A1* | 1/2023 | Clifton ................ G06F 3/0482 |
| 2023/0089417 A1 | 3/2023 | Koga et al. |
| 2023/0094582 A1 | 3/2023 | Wildgrube et al. |
| 2023/0116344 A1 | 4/2023 | Datema et al. |
| 2023/0145238 A1 | 5/2023 | Clifton et al. |
| 2023/0226719 A1 | 7/2023 | Datema et al. |

* cited by examiner

SYSTEM ARCHITECTURE FOR REFUSE VEHICLE

CROSS-REFERENCE TO RELATED PATENT APPLICATION

This application claims the benefit of and priority to U.S. Provisional Application No. 63/339,166, filed May 6, 2022, the entire disclosure of which is incorporated by reference herein.

BACKGROUND

Refuse vehicles collect a wide variety of waste, trash, and other material from residences and businesses. Operators of the refuse vehicles transport the material from various waste receptacles within a municipality to a storage or processing facility (e.g., a landfill, an incineration facility, a recycling facility, etc.).

SUMMARY

One implementation of the present disclosure is a refuse vehicle, according to some embodiments. In some embodiments, the refuse vehicle includes a first controller area network (CAN) bus for body functions of the refuse vehicle. In some embodiments, the refuse vehicle includes multiple controllable elements of a body of the refuse vehicle communicably coupled with the first CAN bus. In some embodiments, the refuse vehicle includes a second CAN bus for chassis functions of the refuse vehicle. In some embodiments, the refuse vehicle includes multiple controllable elements of a chassis of the refuse vehicle communicably coupled with the second CAN bus. In some embodiments, the refuse vehicle includes a telematics module communicably coupled with both the first CAN bus and the second CAN bus. In some embodiments, the telematics module is configured to monitor communications on both the first CAN bus and the second CAN bus and transmit the communications to a cloud computing system. In some embodiments, the first CAN bus and the second CAN bus are communicatively separate and do not communicate with each other directly.

In some embodiments, the controllable elements of the body of the refuse vehicle include at least one of a side or front end lift apparatus configured to grasp and raise a waste receptacle, a tailgate actuator, an independent accessory system, or a lighting device. In some embodiments, the first CAN bus is configured to receive a control input from an input device that is communicably coupled with the first CAN bus and generate a control signal for at least one of the controllable elements responsive to operation of the input device. In some embodiments, the first CAN bus is configured to provide the control signal to the at least one of the plurality of controllable elements without the second CAN bus receiving the control signal.

In some embodiments, the second CAN bus includes an engine control module (ECU) and a transmission control module (TCU). In some embodiments, the second CAN bus is configured to provide an engine control signal to the ECU to operate an engine of the refuse vehicle and a transmission control signal to the TCU to operate a transmission of the refuse vehicle. In some embodiments, the engine control signal is provided on the second CAN bus and not on the first CAN bus, and the transmission control signal is provided on the second CAN bus and not on the first CAN bus.

In some embodiments, the refuse vehicle further includes a body controller communicably coupled with both the first CAN bus and the second CAN bus. In some embodiments, the body controller is configured to receive communications on both the first CAN bus and the second CAN bus and provide control signals to the controllable elements of the first CAN bus. In some embodiments, the body controller is configured to generate the control signals for the controllable elements of the first CAN bus based on communications of the second CAN bus without the communications of the second CAN bus being provided on the first CAN bus. In some embodiments, the first CAN bus includes communications lines that are physically coupled with a body of the refuse vehicle, and the second CAN bus includes communication lines that are physically coupled with the chassis of the refuse vehicle.

Another implementation of the present disclosure is a communications system for a refuse vehicle, according to some embodiments. In some embodiments, the communications system includes a first controller area network (CAN) bus for multiple body functions of the refuse vehicle. In some embodiments, the communications system includes multiple controllable elements of a body of the refuse vehicle communicably coupled with the first CAN bus. In some embodiments, the communications system includes a second CAN bus for multiple chassis functions of the refuse vehicle. In some embodiments, the communications system includes multiple controllable elements of a chassis of the refuse vehicle communicably coupled with the first CAN bus. In some embodiments, the communications system includes a telematics module communicably coupled with both the first CAN bus and the second CAN bus. In some embodiments, the telematics module is configured to monitor communications on both the first CAN bus and the second CAN bus and transmit the communications to a cloud computing system. In some embodiments, the first CAN bus and the second CAN bus are communicatively separate and do not communicate with each other directly.

In some embodiments, the controllable elements of the body of the refuse vehicle include at least one of a side or front end lift apparatus configured to grasp and raise a waste receptacle, a tailgate actuator, an independent accessory system, or a lighting device. In some embodiments, the first CAN bus is configured to receive a control input from an input device that is communicably coupled with the first CAN bus and generate a control signal for at least one of the controllable elements responsive to operation of the input device.

In some embodiments, the first CAN bus is configured to provide the control signal to the at least one of the controllable elements without the second CAN bus receiving the control signal. In some embodiments, the second CAN bus includes an engine control module (ECU) and a transmission control module (TCU). In some embodiments, the second CAN bus is configured to provide an engine control signal to the ECU to operate an engine of the refuse vehicle and a transmission control signal to the TCU to operate a transmission of the refuse vehicle. In some embodiments, the engine control signal is provided on the second CAN bus and not on the first CAN bus, and the transmission control signal is provided on the second CAN bus and not on the first CAN bus.

In some embodiments, the communications system further includes a body controller communicably coupled with both the first CAN bus and the second CAN bus. In some embodiments, the body controller is configured to receive communications on both the first CAN bus and the second CAN bus and provide control signals to the controllable elements of the first CAN bus. In some embodiments, the body controller is configured to generate the control signals for the controllable elements of the first CAN bus based on communications of the second CAN bus without the communications of the second CAN bus being provided on the first CAN bus.

In some embodiments, the first CAN bus includes communications lines that are physically coupled with a body of the refuse vehicle. In some embodiments, the second CAN bus includes communication lines that are physically coupled with the chassis of the refuse vehicle.

Another implementation of the present disclosure is a method for controlling operation of a refuse vehicle, according to some embodiments. In some embodiments, the method includes providing a refuse vehicle having a first controller area network (CAN) bus for body operations of the refuse vehicle, and a second controller area network (CAN) bus for chassis operations of the refuse vehicle. In some embodiments, the first CAN bus and the second CAN bus are communicatively separate from each other. In some embodiments, the method includes obtaining communications from the first CAN bus and the second CAN bus at a telematics module that is communicably coupled with both the first CAN bus and the second CAN bus. In some embodiments, the method includes providing a control communication to a controllable element of a body of the refuse vehicle via the first CAN bus, and operating the controllable element of the body of the refuse vehicle based on the control communication.

In some embodiments, the refuse vehicle includes multiple controllable elements communicably coupled with the first CAN bus. In some embodiments, the first CAN bus is configured to provide control communications to the controllable elements of the first CAN bus without the second CAN bus receiving the control communications.

In some embodiments, the second CAN bus includes an engine control module (ECU) and a transmission control module (TCU). In some embodiments, the second CAN bus is configured to provide an engine control signal to the ECU to operate an engine of the refuse vehicle and a transmission control signal to the TCU to operate a transmission of the refuse vehicle. In some embodiments, the engine control signal is provided on the second CAN bus and not on the first CAN bus, and the transmission control signal is provided on the second CAN bus and not on the first CAN bus.

In some embodiments, the refuse vehicle includes a body controller communicably coupled with both the first CAN bus and the second CAN bus. In some embodiments, the body controller is configured to receive communications on both the first CAN bus and the second CAN bus and provide control signals to multiple controllable elements of the first CAN bus. In some embodiments, the body controller is configured to generate the control signals for the controllable elements of the first CAN bus based on communications of the second CAN bus without the communications of the second CAN bus being provided on the first CAN bus.

In some embodiments, the first CAN bus includes communications lines that are physically coupled with a body of the refuse vehicle. In some embodiments, the second CAN bus includes communication lines that are physically coupled with a chassis of the refuse vehicle.

In some embodiments, the body operations include at least one of operating a lift assembly to raise or lower a refuse receptacle, operating a tailgate actuator to raise or lower a tailgate, operating an independent accessory system, or operating a lighting system.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Figure 1:
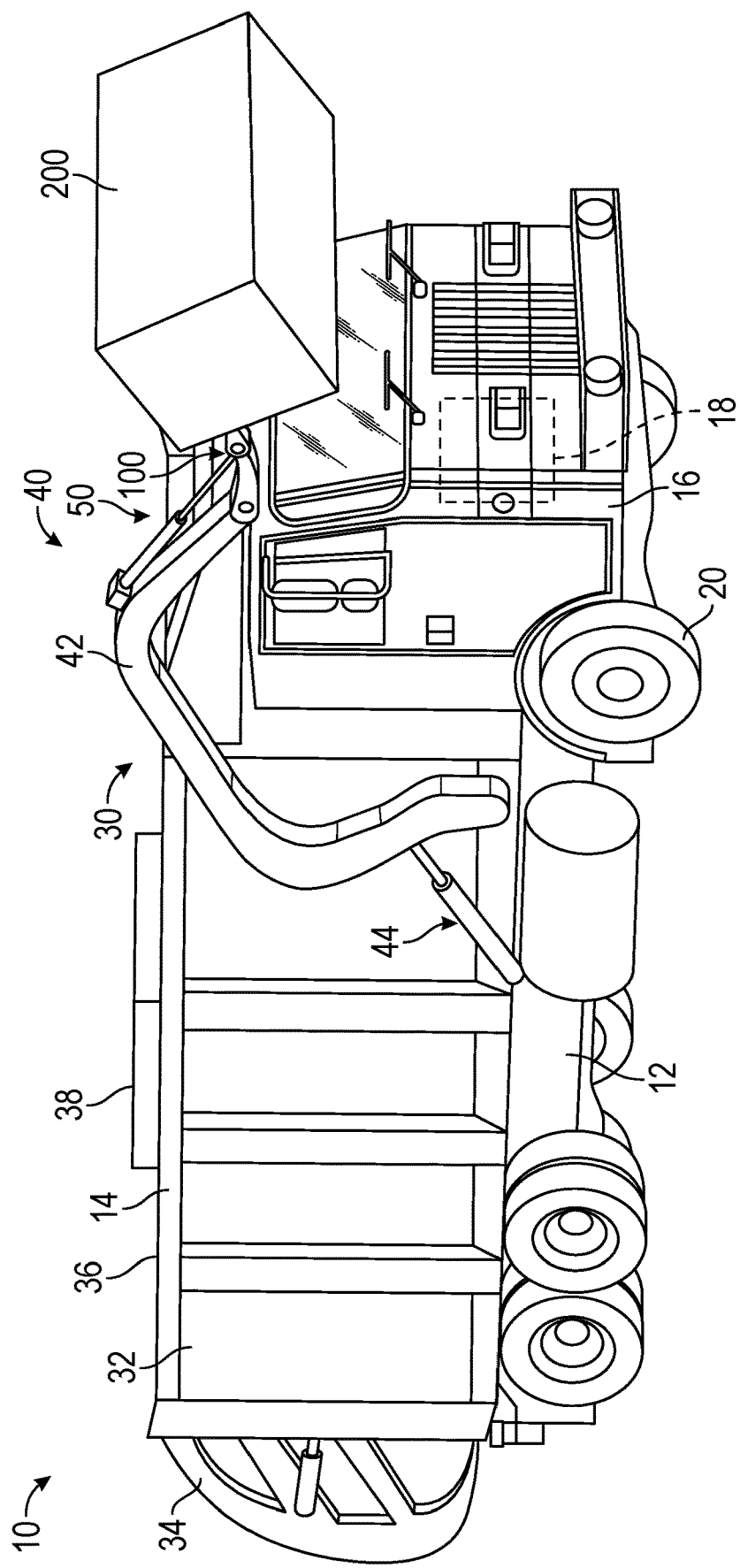
FIG. 1 is a perspective view of a refuse vehicle, according to some embodiments.

According to the exemplary embodiment shown in FIG. 1, a vehicle, shown as refuse vehicle 10 (e.g., a garbage truck, a waste collection truck, a sanitation truck, etc.), is configured as a front-loading refuse truck. According to the exemplary embodiment shown in FIG. 2, the refuse vehicle 10 is shown as a side-loading refuse truck. In other embodiments, the refuse vehicle 10 is configured as a rear-loading refuse truck. In still other embodiments, the vehicle is another type of vehicle (e.g., a skid-loader, a telehandler, a plow truck, a boom lift, a concrete mixer, etc.). As shown in FIG. 1, the refuse vehicle 10 includes a chassis, shown as frame 12; a body assembly, shown as body 14, coupled to the frame 12 (e.g., at a rear end thereof, etc.); and a cab, shown as cab 16, coupled to the frame 12 (e.g., at a front end thereof, etc.). The frame 12 extends longitudinally (i.e., along a direction of travel of the vehicle 10). A lateral direction is defined perpendicular to the longitudinal direction. The cab 16 may include various components to facilitate operation of the refuse vehicle 10 by an operator (e.g., a seat, a steering wheel, hydraulic controls, a user interface, switches, buttons, dials, etc.). As shown in FIG. 1, the refuse vehicle 10 includes a prime mover or primary driver (e.g., an engine, an electric motor, etc.), shown as engine 18, coupled to the frame 12 at a position beneath the cab 16. The engine 18 is configured to provide power to tractive elements, shown as wheels 20, and/or to other systems of the refuse vehicle 10 (e.g., a pneumatic system, a hydraulic system, an electrical system, etc.). The engine 18 may be configured to utilize one or more of a variety of fuels (e.g., gasoline, diesel, bio-diesel, ethanol, natural gas, etc.), according to various exemplary embodiments. According to an alternative embodiment, the engine 18 additionally or alternatively includes one or more electric motors coupled to the frame 12 (e.g., a hybrid refuse vehicle, an electric refuse vehicle, etc.). The electric motors may consume electrical power from an on-board storage device (e.g., batteries, ultra-capacitors, etc.), from an on-board generator (e.g., an internal combustion engine, solar panels, etc.), and/or from an external power source (e.g., overhead power lines, etc.) and provide power to the systems of the refuse vehicle 10.

According to an exemplary embodiment, the refuse vehicle 10 is configured to transport refuse from various waste receptacles within a municipality to a storage and/or processing facility (e.g., a landfill, an incineration facility, a recycling facility, etc.). As shown in FIG. 1, the body 14 includes a series of panels, shown as panels 32, a tailgate 34, and a cover 36. The panels 32, the tailgate 34, and the cover 36 define a collection chamber (e.g., hopper, etc.), shown as refuse compartment 30. Loose refuse may be placed into the refuse compartment 30 where it may thereafter be compacted. The refuse compartment 30 may provide temporary storage for refuse during transport to a waste disposal site and/or a recycling facility. In some embodiments, at least a portion of the body 14 and the refuse compartment 30 extend in front of the cab 16. According to the embodiments shown in FIGS. 1 and 2, the body 14 and the refuse compartment 30 are positioned behind the cab 16. In some embodiments, the refuse compartment 30 includes a hopper volume and a storage volume. Refuse may be initially loaded into the hopper volume and thereafter compacted into the storage volume. According to an exemplary embodiment, the hopper volume is positioned between the storage volume and the cab 16 (i.e., refuse is loaded into a position within the refuse compartment 30 behind the cab 16 and stored in a position further toward the rear of the refuse compartment 30). In other embodiments, the storage volume is positioned between the hopper volume and the cab 16 (e.g., a rear-loading refuse vehicle, etc.).

As shown in FIG. 1, the refuse vehicle 10 includes a first lift mechanism/system (e.g., a front-loading lift assembly, etc.), shown as lift assembly 40. The lift assembly 40 includes a pair of arms, shown as lift arms 42, coupled to the frame 12 and/or the body 14 on either side of the refuse vehicle 10 such that the lift arms 42 extend forward of the cab 16 (e.g., a front-loading refuse vehicle, etc.). In other embodiments, the lift assembly 40 extends rearward of the body 14 (e.g., a rear-loading refuse vehicle, etc.). The lift arms 42 may be rotatably coupled to frame 12 with a pivot (e.g., a lug, a shaft, etc.). As shown in FIG. 1, the lift assembly 40 includes first actuators, shown as lift arm actuators 44 (e.g., hydraulic cylinders, etc.), coupled to the frame 12 and the lift arms 42. The lift arm actuators 44 are positioned such that extension and retraction thereof rotates the lift arms 42 about an axis extending through the pivot, according to an exemplary embodiment.

As shown in FIG. 1, a fork assembly 100 is coupled to the lift arms 42 of the lift assembly 40. The fork assembly 100 includes a plate (e.g., a fork plate) and a pair of forks. According to an exemplary embodiment, the forks are coupled (e.g., attached, fastened, welded, etc.) to the fork plate. The forks may have a generally rectangular cross-sectional shape and are configured to engage a refuse container (e.g., protrude through fork pockets of a commercial refuse container, a carry can, the container assembly 200, etc.). During operation of the refuse vehicle 10, the forks are positioned to engage the refuse container (e.g., the refuse vehicle 10 is driven into position such that the forks protrude through fork pockets within the refuse container, etc.).

As shown in FIG. 1, the lift arms 42 are rotated by the lift arm actuators 44 to lift the forks 120 and the refuse container over the cab 16. As shown in FIG. 1, the lift assembly 40 includes second actuators, shown as articulation actuators 50 (e.g., hydraulic cylinders, etc.). According to an exemplary embodiment, the articulation actuators 50 are positioned to articulate the fork assembly 100 relative to the lift arms 42. Such articulation may assist in tipping refuse out of the refuse container (e.g., coupled to the lift assembly 40 by the fork assembly 100, etc.) and into the hopper volume of the refuse compartment 30 through an opening in the cover 36. The lift arm actuators 44 may thereafter rotate the lift arms 42 to return the refuse container to the ground. According to an exemplary embodiment, a door, shown as top door 38, is movably coupled along the cover 36 to seal the opening thereby preventing refuse from escaping the refuse compartment 30 (e.g., due to wind, bumps in the road, etc.). The body 14 may define an opening through which refuse may be added to the refuse compartment 30.

As shown in FIG. 1, the fork assembly 100 is configured to selectively couple to a front-loading refuse container assembly, shown as container assembly 200. The container assembly 200 includes a container that includes a series of walls that cooperatively define an internal cavity or volume.

Figure 2:
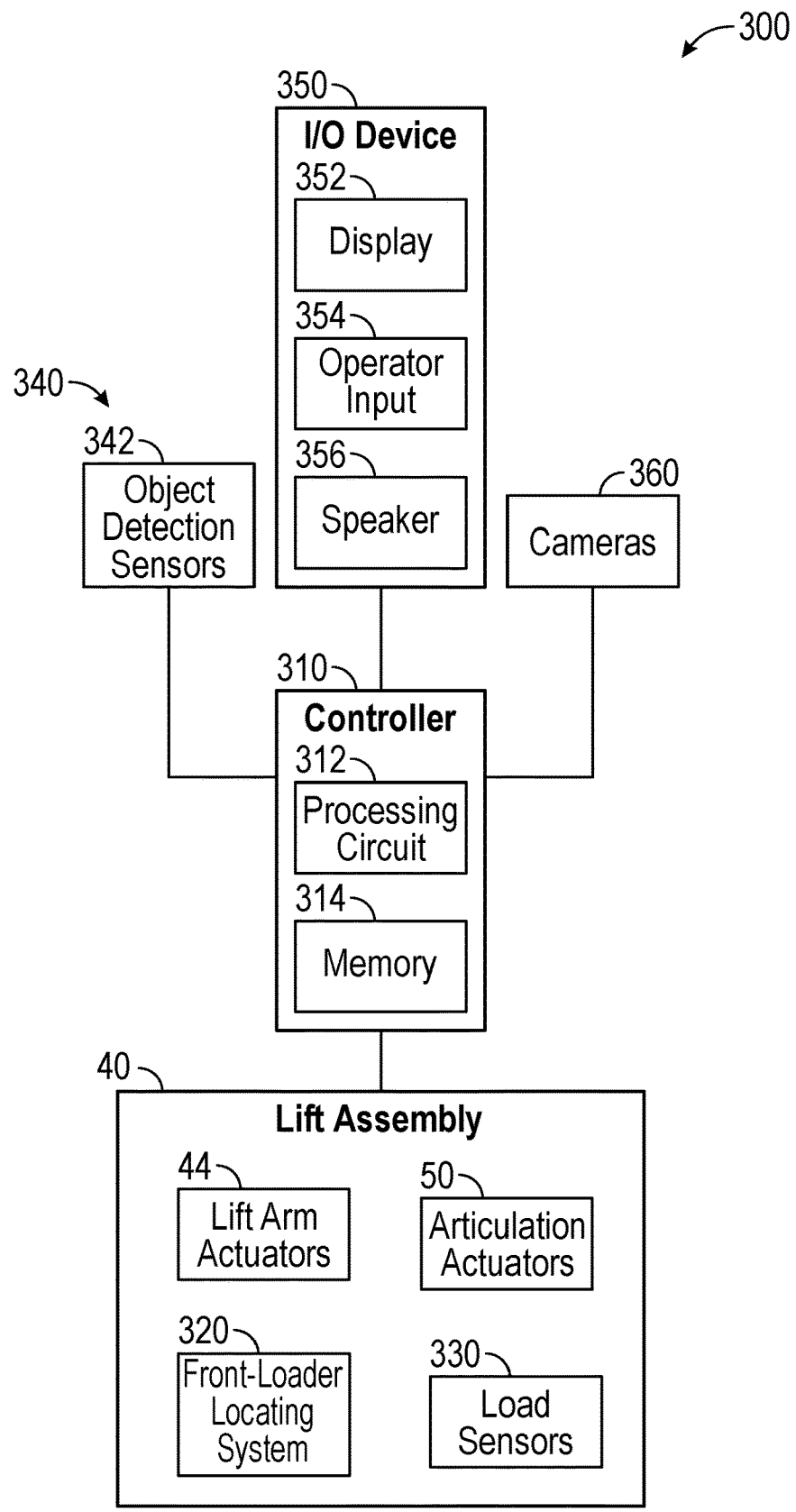
FIG. 2 is a block diagram of a control system for the refuse vehicle of FIG. 1, according to some embodiments.

According to the exemplary embodiment shown in FIG. 2, a refuse vehicle control system, shown as control system 300, for the refuse vehicle 10 includes a controller 310. In one embodiment, the controller 310 is configured to selectively engage, selectively disengage, control, and/or otherwise communicate with components of the refuse vehicle 10. By way of example, the controller 310 may observe the operation of the refuse vehicle 10, control one or more subsystems, receive inputs from an operator, and provide information to an operator. As shown in FIG. 2, the controller 310 is operatively coupled (e.g., through a pump and/or valves) to the lift arm actuators 44, and the articulation actuators 50. In other embodiments, the controller is coupled to more or fewer components.

The controller 310 may be implemented as a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. According to the exemplary embodiment shown in FIG. 2, the controller 310 includes a processing circuit 312 and a memory 314. The processing circuit 312 may include an ASIC, one or more FPGAs, a DSP, circuits containing one or more processing components, circuitry for supporting a microprocessor, a group of processing components, or other suitable electronic processing components. In some embodiments, the processing circuit 312 is configured to execute computer code stored in the memory 314 to facilitate the activities described herein. The memory 314 may be any volatile or non-volatile computer-readable storage medium capable of storing data or computer code relating to the activities described herein. According to an exemplary embodiment, the memory 314 includes computer code modules (e.g., executable code, object code, source code, script code, machine code, etc.) configured for execution by the processing circuit 312. In some embodiments, the controller 310 represents a collection of processing devices (e.g., servers, data centers, etc.). In such cases, the processing circuit 312 represents the collective processors of the devices, and the memory 314 represents the collective storage devices of the devices.

The control system 300 may further includes a position sensor system, shown as front-loader locating system 320, operatively coupled to the controller 310. The front-loader locating system 320 may include one or more of the following sensors: linear position sensors (e.g., linear variable differential transformers, linear potentiometers, linear encoders, magnetostrictive sensors, etc.), angular position sensors (e.g., rotary potentiometers, rotary encoders, etc.), accelerometers, gyroscopic sensors, or other types of sensors that provide information (e.g., data) regarding the position and/or orientation of an object. The controller 310 is configured to use information from the front-loader locating system 320 to determine the position and/or orientation of the lift assembly 40 relative to the frame 12 and/or body 14. Various geometric relationships throughout the refuse vehicle 10 may be predetermined and stored in the memory 314 to facilitate this determination. By way of example, the ratio between the length of the articulation actuators 50 and the angle between the lift arms 42 and the fork assembly 100 may be predetermined and stored in the memory 314.

The controller 310 is configured to use information from the front-loader locating system 320 to determine the position and/or orientation of the lift arms 42 and/or the fork assembly 100 relative to the frame 12 and/or body 14. By way of example, one or more of the lift arm actuators 44 and the articulation actuators 50 may include a linear position sensor that provides information relating to the length of each actuator. The controller 310 may use these lengths to determine the orientation of the fork assembly 100 relative to the lift arms 42 and the orientation of the lift arms 42 relative to the frame 12 and/or body 14. Alternatively, the front-loader locating system 320 may include angular position sensors that provide the orientation of the fork assembly 100 relative to the lift arms 42 and the orientation of the lift arms 42 relative to the frame 12 and/or body 14 directly.

The control system 300 may further include load sensors (e.g., pressure sensors, strain gauges, etc.), shown as load sensors 330, coupled to one or more of the actuators and/or structural elements of the refuse vehicle 10 (e.g., the lift arms 42) and operatively coupled to the controller 310. The load sensors 330 are configured to provide information indicative of an output force of the corresponding actuator and/or a weight or load supported by the corresponding refuse collection arm. By way of example, one or more of the lift arm actuators 44, the articulation actuators 50, etc., may be hydraulic cylinders. The load sensors 330 may be hydraulic pressure sensors fluidly coupled to the hydraulic cylinders and configured to provide a pressure of the hydraulic fluid within an extension chamber or a retraction chamber of the corresponding hydraulic cylinder. The controller 310 may be configured to use this pressure along with the geometry of the hydraulic cylinder (e.g., a surface area of a piston) stored in the memory 314 to determine an output force of the hydraulic cylinder. In such an embodiment, the load sensor 330 may be located within a directional control valve that controls the direction of movement of each actuator. The directional control valve may be configured such that the load sensor 330 is automatically fluidly coupled to whichever chamber of the hydraulic cylinder is pressurized. In other embodiments, the load sensor 330 is another type of sensor capable of measuring a load, such as a pneumatic pressure sensor or a strain gage.

Referring still to FIG. 2, the control system 300 may further include an imaging system or distance sensing system, shown as object detection system 340, operatively coupled to the controller 310. The object detection system 340 includes one or more distance, shape, or imaging sensors, shown as object detection sensors 342, such as radar systems, LIDAR systems, ultrasonic sensors, camera imaging systems, and/or other types of sensors. The object detection sensors 342 are configured to provide object detection data relating to the position and/or orientation of an object (e.g., a refuse container, a pedestrian, a mail box, a bicycle, a tree, etc.) relative to the body 14. In some embodiments, the object detection sensors 342 are each configured to indicate whether or not an object is present within a range of locations (e.g., a range of lateral, longitudinal, and/or vertical locations) relative to the body 14. The boundaries of the range of locations may correspond to the limits of what the object detection system 340 is capable of detecting. In other embodiments, the object detection sensors 342 are configured to provide the location of an object within the range of locations relative to the body 14. In some embodiments, the object detection sensors 342 provide the locations of multiple points along the surface of the object such that a shape of the object may be determined by the controller 310.

The object detection sensors 342 may be positioned on the body 14 or on a refuse container such that the range of locations contains an area in which a collection arm assembly operates. Alternatively, the object detection sensors 242 may be positioned such that the range of locations covers areas that are likely to contain objects that may collide with the refuse vehicle and/or that are minimally visible to an operator located in the cab 16. By way of example, the range of locations may cover a blind spot of the refuse vehicle 10 or may extend behind or above the refuse vehicle 10. The size and shape of the range of locations may correspond to the physical limitations of the object detection sensor 342. Alternatively, the size and shape of the range of locations may be limited to a desired range.

Referring still to FIG. 2, the control system 300 further includes an operator interface, shown as input/output "I/O" device 350, operably coupled to the controller 310. The I/O device 350 is configured to receive commands from an operator and provide information to the operator. The I/O device 350 includes a display 352 and an operator input 354. The display 352 may be configured to display a graphical user interface, an image, a video, an icon, and/or still other information. In some embodiments, the display 352 is a touchscreen such that the display also acts as an operator input 354. In one embodiment, the display 352 includes a graphical user interface configured to provide general information about the refuse vehicle 10 (e.g., vehicle speed, fuel level, warning lights, battery level, etc.). The operator input 354 may include buttons, switches, knobs, joysticks, microphones, or other user input devices. The I/O device 350 further includes an auditory output device, shown as speaker 356, that is configured to provide auditory cues or indications (e.g., sound signals) to the operator. The I/O device 350 may be or include a user interface within the cab 16, a user interface on the side of the body 14, and/or a portable device wirelessly connected to the controller 310 (e.g., a mobile device, a smartphone, a tablet, etc.).

Referring still to FIG. 2, the control system 300 further includes a series of sensors, shown as cameras 360, that are operably coupled to the controller 310. In some embodiments, the cameras 360 are part of the object detection system 340. The cameras 360 are configured to record video in various locations (e.g., of various areas) around the refuse vehicle 10. The recorded videos are provided to the display 352 through the controller 310, and the display 352 displays the recorded videos in real time. The cameras 360 may be located such that the displayed video shows the operator areas that would not otherwise be visible from the cab 16. By way of example, the cameras 360 may show a blind spot of the refuse vehicle 10 or show an area directly behind the refuse vehicle 10.

Figure 3:
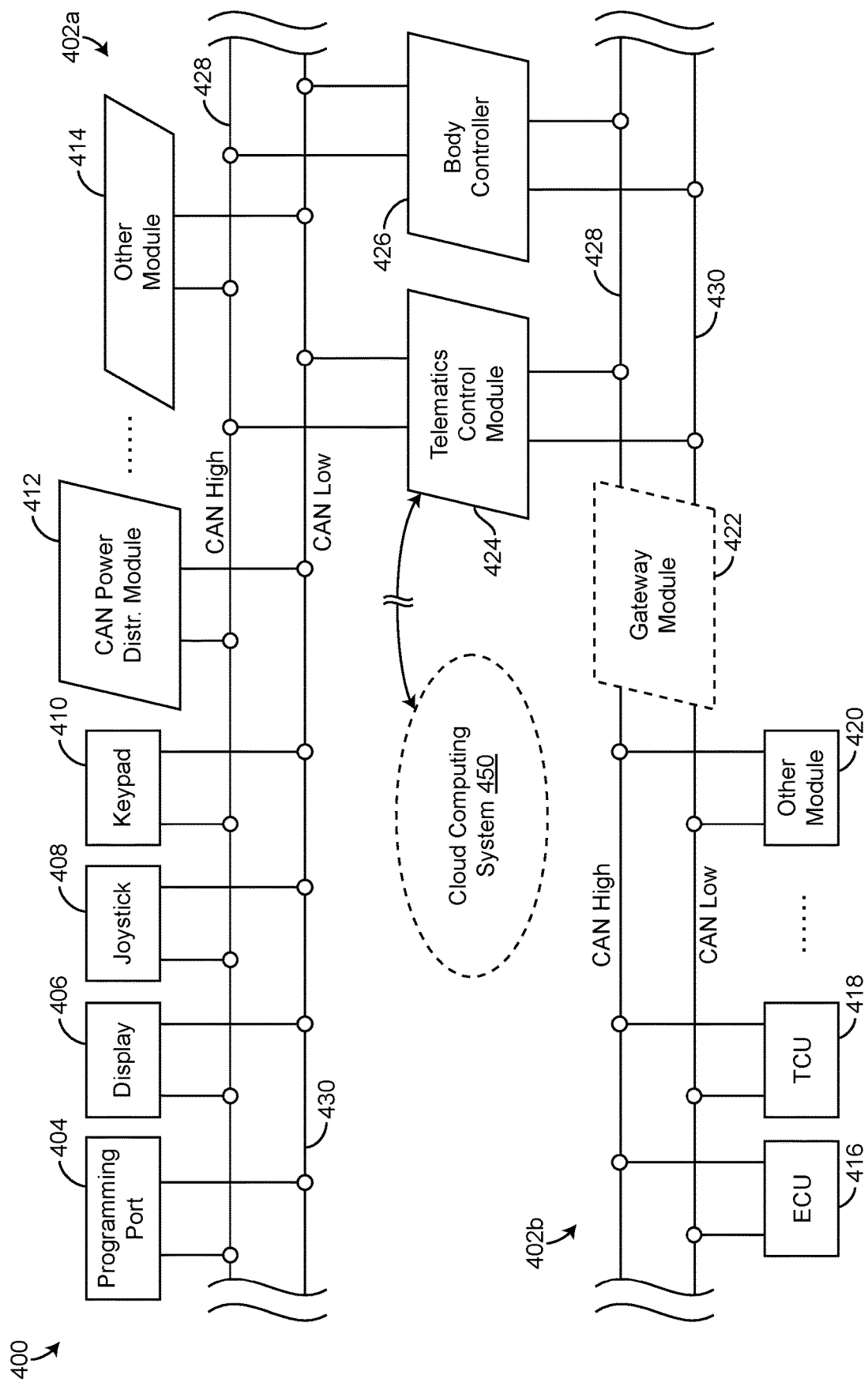
FIG. 3 is a block diagram of a CAN bus system for the refuse vehicle of FIG. 1, according to some embodiments.

Referring to FIG. 3, a CAN bus system 400 (e.g., a control system, a communications system, etc.) for the refuse vehicle 10 includes a fist CAN bus 402*a* and a second CAN bus 402*b*, according to some embodiments. The first CAN bus 402*a* may be structurally similar to the second CAN bus 402*b*. The first CAN bus 402*a* is in communications (e.g., wiredly) with various modules, devices, sensors, control units, input devices, etc., of body functions of the vehicle 10. The second CAN bus 402*a* is in communications (e.g., wiredly) with various modules, devices, sensors, control inputs, input devices, etc., of chassis functions of the vehicle 10. The first CAN bus 402*a* and the second CAN bus 402*b* may be communicably distinct from each other, and operate in parallel to provide controls for both body functions or operations and chassis functions or operations. In some embodiments, a body controller 426 (e.g., the controller 310) is communicably coupled with both the first CAN bus 402*a* and the second CAN bus 402*b*. The body controller 426 may be configured to monitor communications on the second CAN bus 402*b* (e.g., communications associated with the chassis functions such as driving operations, shifting of a transmission of the refuse vehicle 10, current speed of the refuse vehicle 10, operation of a primary mover of the refuse vehicle 10 such as an electric motor, an engine, a hybrid driveline, etc.) and both monitor communications on the first CAN bus 402*a* and provide control signals to various modules on the first CAN bus 402*a*. In some embodiments, the body controller 426 is communicably coupled with the second CAN bus 402*b* but does not provide control inputs to various devices on the second CAN bus 402*b*. The first CAN bus 402*a* and/or the second CAN bus 402*b* are configured to provide control signals or control communications to various controllable elements of the body (e.g., the lift arm actuators 44, the articulation actuators 50, a compaction apparatus, body lights, etc.) or the chassis (e.g., the engine 18, a transmission, an energy storage system, a fuel system, etc.), respectively.

In some embodiments, the first CAN bus 402*a* and/or the second CAN bus 402*b* are the same as or similar to the CAN bus as described in U.S. application Ser. No. 17/879,947, filed Aug. 3, 2022, the entire disclosure of which is incorporated by reference herein. In some embodiments, the refuse vehicle 10 is an electric refuse vehicle that includes electrical chassis components and/or electrical body components as described in greater detail in U.S. application Ser. No. 18/170,879, filed Feb. 17, 2023, the entire disclosure of which is incorporated by reference herein. In some embodiments, the controllable elements of the body or the chassis of the refuse vehicle 10 include an independently operational accessory system that is the same as or similar to the system described in greater detail in U.S. application Ser. No. 18/131,701, filed Apr. 6, 2023, the entire disclosure of which is incorporated by reference herein.

Referring still to FIG. 3, the first CAN bus 402*a* and the second CAN bus 402*b* both include a first wire (e.g., a first communication line), shown as CAN high 428 and a second wire (e.g., a second communication line), shown as CAN low 430. Each module of the first CAN bus 402*a* and the second CAN bus 402*b* are wiredly coupled with both the CAN high 428 and the CAN low 430 of the respective CAN bus 402*a* or 402*b*. The modules may communicate signals along the CAN high 428 and the CAN low 430 for transmitting differential wired-AND communications. In some embodiments, the CAN high 428 and the CAN low 430 of the first CAN bus 402*a* and the second CAN bus 402*b* are communications lines that extend physically along different portions of the refuse vehicle 10 (e.g., along the chassis 12). The CAN high 428 and the CAN low 430 communications lines may have a maximum length. In some embodiments, a resistance at each node or module of the first CAN bus 402*a* or the second CAN bus 402*b* is 60 Ohms. In some embodiments, the CAN high 428 and the CAN low 430 of the first CAN bus 402*a* and the second CAN bus 402*b* are provided as separate physical wires that are coupled on the body 14 and the chassis 12 and are configured to operate independently of each other (e.g., the second CAN bus 402*b* may be installed on the chassis 12 and fully operable before installation of the first CAN bus 402*a*).

Referring still to FIG. 3, the first CAN bus 402*a* includes a programming port 404, a display 406, a joystick 408, a keypad 410, a CAN power distribution module 412, and any other modules 414. Each of the modules or devices 404-414 of the first CAN bus 402*a* are communicably coupled with both the CAN high 428 and the CAN low 430 communications lines. In some embodiments, the programming port 404 is a data port for facilitating communicable coupling with an external device or system for programming any of the modules of the first CAN bus 402*a*. In some embodiments, the display 406 is the display 352 of the I/O device 350. In some embodiments, the joystick 408 is an input device of a human machine interface ("HMI") so that an operator of the vehicle 10 can input one or more control inputs for any body operations or functions. The keypad 410 may similarly be an input device of the HMI or the I/O device 350. In some embodiments, the other modules 414 include any of the object detection sensors 342, the cameras 360, the I/O device 350, the lift assembly 40, a power take-off unit, an independent accessory system (e.g., including compressed natural gas tanks and a compressor), a compaction apparatus, a front lift apparatus, electric actuators, a grasping apparatus, a carry can apparatus, a tailgate actuators (e.g., an linear electric actuator, a hydraulic actuator, etc.), a lighting system of the refuse vehicle 10, etc.

The second CAN bus 402*b* includes an engine control unit ("ECU") 416, a transmission control unit ("TCU") 418, and any other modules 420, according to some embodiments. The ECU 416, the TCU 418, and the other modules 420 are each connected (e.g., wiredly) with both the CAN high 428 and the CAN low 430 communication lines of the second CAN bus 402*b*, according to some embodiments. In some embodiments, the ECU 416 is configured to communicate on the second CAN bus 402*b* and operate or control the engine 18 of the refuse vehicle 10. In some embodiments, the TCU 418 is configured to communicate on the second CAN bus 402*b* and operate or control a transmission of the refuse vehicle 10.

Referring still to FIG. 3, the CAN bus 400 includes a telematics control module 424 that bridges between the first CAN bus 402*a* and the second CAN bus 402*b*, and is coupled with both the CAN high 428 and the CAN low 430 communications lines of the first CAN bus 402*a* and the second CAN bus 402*b*. The telematics control module 424 is configured to monitor communications activity of both the first CAN bus 402*a* and the second CAN bus 402*b* and transmit any monitored communications to a cloud computing system 450. The telematics control module 424 may monitor all communications on both the first CAN bus 402*a* and the second CAN bus 402*b* and transmit any or all of the communications to the cloud computing system 450. In some embodiments, the telematics control module 424 functions as a bridge between the first CAN bus 402*a* and the second CAN bus 402*b* so that the cloud computing system 450 can receive communications regarding operations or communications of both body and chassis functions of the refuse vehicle 10. In some embodiments, the telematics control module 424 is configured to communicate with the cloud computing system 450 using a wireless communications protocol such as cellular communications, WiFi communications, Bluetooth, etc. The telematics control module 424 can be configured to also receive commands from the cloud computing system 450 for body operations and transmit a control signal or communication to an appropriate device (e.g., the lift arm actuators 44, the articulation actuators 50, etc.) via the first CAN bus 402*a*. In some embodiments, the telematics control module 424 or the body controller 426 are configured to monitor communications on the second CAN bus 402*b* (e.g., chassis operations) and adjust or provide control communications to any modules of the first CAN bus 402*a* (e.g., the lift arm actuators 44, the articulation actuators 50, etc.). In this way, the first CAN bus 402*a* and the second CAN bus 402*b* do not directly communicate with each other, and have separate bus traffic, but the second CAN bus 402*b* or communications thereof can be used (e.g., by the telematics control module 424 or the body controller 426) to control body operations without the first CAN bus 402*a* and the second CAN bus 402*b* communicating with each other.

In some embodiments, the second CAN bus 402*b* also includes a gateway module 422. The gateway module 422 may be optional. In some embodiments, the gateway module 422 functions as a central electronic control module for the second CAN bus 402*b* and performs one or more frame or signal mapping functions.

The refuse vehicle 10 can be a front loading refuse vehicle, a side loading refuse vehicle, a rear loading refuse vehicle, etc. In some embodiments, any of the body operations are associated with different controllable elements (e.g., actuators, linear electric actuators, electric motors, hydraulic actuators, etc.). In some embodiments, the controllable elements of the first CAN bus 402*a* include a side loading arm, a rear loading arm, a tailgate, a tailgate tipper, a compaction apparatus, an intermediate loading arm, etc. In some embodiments, the controllable elements of the second CAN bus 402*b* include the engine 18, an electric primary mover that drives tractive elements of the refuse vehicle 10 for transportation, a transmission, a driveline, etc., of the refuse vehicle 10.

Advantageously, using the first CAN bus 402*a* and the second CAN bus 402*b* facilitates improved bandwidth of communications of components of the refuse vehicle 10. For example, using the first CAN bus 402*a* for body operations (e.g., inputs, outputs, transmission of control signals, etc.) of the refuse vehicle 10 such as operation of lift apparatuses of the refuse vehicle 10, distinct from the second CAN bus 402*b* which is responsible for chassis operations (e.g., engine control, transmission control, steering control, etc., or any other chassis controls) improves transmission speed of communications on the CAN bus system 400. The traffic of the first CAN bus 402*a* may be higher, and using the first CAN bus 402*a* that is separate from the second CAN bus 402*b* reduces a likelihood of error on the second CAN bus 402*b* due to excessive communications traffic that may otherwise be present if communications associated with body functions or operations are communicated on the second CAN bus 402*b* (e.g., in a single CAN bus system).

Figure 4:
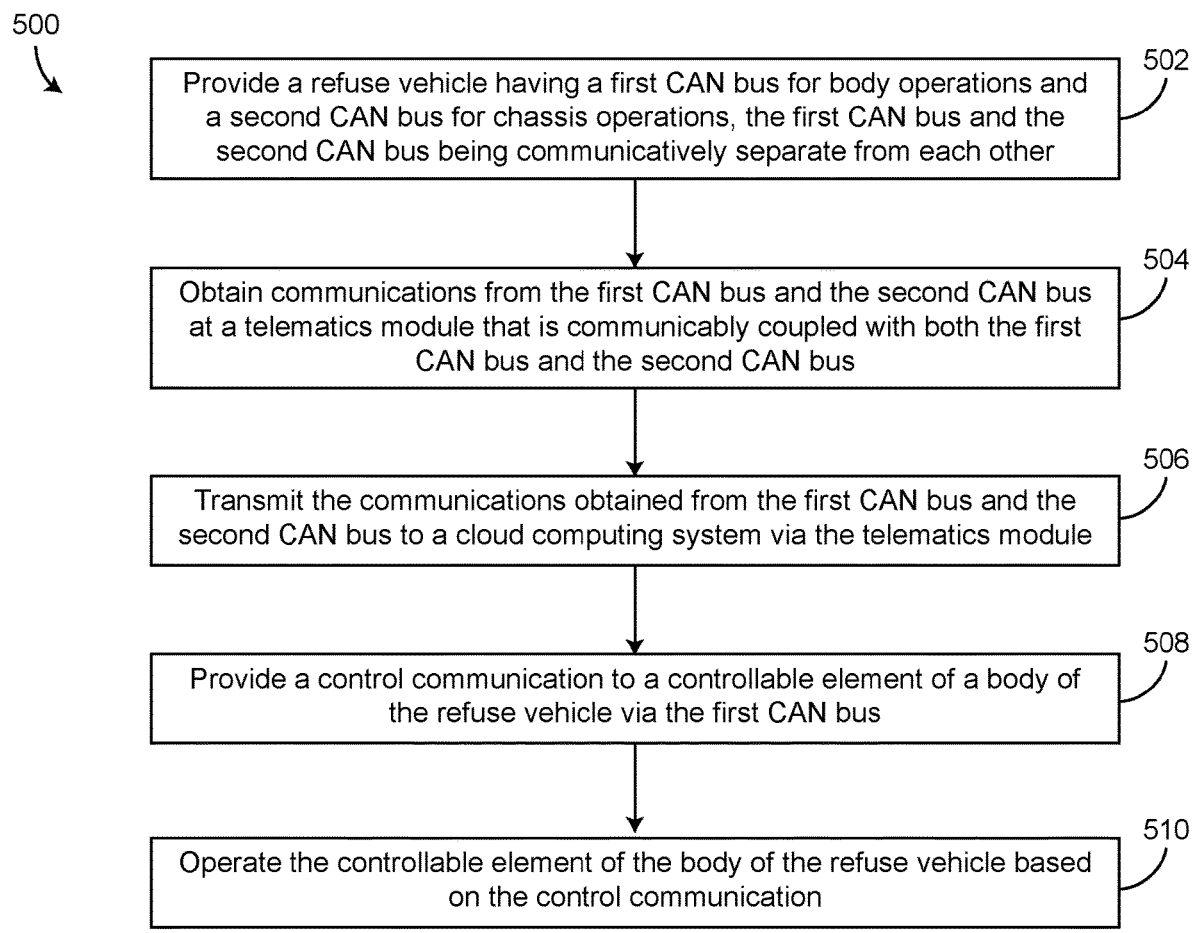
FIG. 4 is a flow diagram of a process for using a refuse vehicle having separate CAN busses, according to some embodiments.

Referring to FIG. 4, a flow diagram of a process 500 for providing and using the CAN bus system 400 is shown, according to some embodiments. The process 500 includes steps 502-510 that may be performed by different components of the refuse vehicle 10 or the CAN bus system 400, according to some embodiments.

Process 500 includes providing a refuse vehicle having a first CAN bus for body operations and a second CAN bus for chassis operations, the first CAN bus and the second CAN bus being communicatively separate from each other (step 502), according to some embodiments. In some embodiments, the first CAN bus is the first CAN bus 402*a* and the second CAN bus is the second CAN bus 402*b*. The second CAN bus can include at least an ECU and a TCU communicatively coupled with the second CAN bus. The first CAN bus can include one or more input devices, actuators of a lift or collection arm of the refuse vehicle, a control unit for a compaction apparatus or tailgate, etc. The refuse vehicle may be the refuse vehicle 10.

Process 500 includes obtaining communications from the first CAN bus and the second CAN bus at a telematics module that is communicably coupled with both the first CAN bus and the second CAN bus (step 504), according to some embodiments. In some embodiments, the telematics module is the telematics control module 424. The telematics module can be communicatively coupled with both the first CAN bus and the second CAN bus so that the telematics module can read communications on both the first and second CAN bus associated with body or chassis operations, respectively. The telematics control module can read communications on both the first CAN bus and the second CAN bus without the first CAN bus and the second CAN bus communicating with each other.

Process 500 includes transmitting the communications obtained from the first CAN bus and the second CAN bus to a cloud computing system via the telematics module (step 506), according to some embodiments. In some embodiments, step 506 is performed by the telematics module. In some embodiments, the telematics module obtains the communications associated with any functions, operations, status, etc., of any controllable elements associated with the body operations or the chassis operations of the refuse vehicle and provides the communications to the cloud computing system via cellular communications.

Process 500 includes providing a control communication to a controllable element of a body of the refuse vehicle via the first CAN bus (step 508), according to some embodiments. In some embodiments, the control communication is generated by the telematics modules, or is received by the telematics module from the cloud computing system. In some embodiments, the control communication is generated responsive to a user input. The controllable element may be a lift arm, a collection apparatus, an actuator, a hydraulic cylinder, a compaction apparatus, a front loading apparatus, a rear loading apparatus, a tailgate, etc., of the refuse vehicle.

Process 500 includes operating the controllable element of the body of the refuse vehicle based on the control communication (step 510), according to some embodiments. In some embodiments, step 510 is performed by the controllable element (e.g., a lift arm, a collection apparatus, an actuator, a hydraulic cylinder, a compaction apparatus, a front loading apparatus, a rear loading apparatus, a tailgate, etc., of the refuse vehicle).

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the refuse vehicle 10 as shown in the various exemplary embodiments is illustrative only. Additionally, any element disclosed in one embodiment may be incorporated or utilized with any other embodiment disclosed herein.

What is claimed is:
1. A refuse vehicle comprising:
a first controller area network (CAN) bus for a plurality of body functions of the refuse vehicle;

a plurality of controllable elements of a body of the refuse vehicle communicably coupled with the first CAN bus;

a second CAN bus for a plurality of chassis functions of the refuse vehicle;

a plurality of controllable elements of a chassis of the refuse vehicle communicably coupled with the second CAN bus; and a telematics module communicably coupled with both the first CAN bus and the second CAN bus, the telematics module configured to monitor communications on both the first CAN bus and the second CAN bus and transmit the communications to a cloud computing system;

wherein the first CAN bus and the second CAN bus are communicatively separate and do not communicate with each other directly.

2. The refuse vehicle of claim 1, wherein the plurality of controllable elements of the body of the refuse vehicle comprise at least one of:

a side or front end lift apparatus configured to grasp and raise a waste receptacle;

a tailgate actuator;

an independent accessory system; or a lighting device.

3. The refuse vehicle of claim 1, wherein the first CAN bus is configured to receive a control input from an input device that is communicably coupled with the first CAN bus and generate a control signal for at least one of the plurality of controllable elements of the body responsive to operation of the input device.

4. The refuse vehicle of claim 3, wherein the first CAN bus is configured to provide the control signal to the at least one of the plurality of controllable elements of the body without the second CAN bus receiving the control signal.

5. The refuse vehicle of claim 1, wherein the second CAN bus comprises an engine control module (ECU) and a transmission control module (TCU), the second CAN bus configured to provide an engine control signal to the ECU to operate an engine of the refuse vehicle and a transmission control signal to the TCU to operate a transmission of the refuse vehicle, wherein the engine control signal is provided on the second CAN bus and not on the first CAN bus, and the transmission control signal is provided on the second CAN bus and not on the first CAN bus.

6. The refuse vehicle of claim 1, further comprising a body controller communicably coupled with both the first CAN bus and the second CAN bus, the body controller configured to receive communications on both the first CAN bus and the second CAN bus and provide control signals to the plurality of controllable elements of the first CAN bus, wherein the body controller is configured to generate the control signals for the plurality of controllable elements of the first CAN bus based on communications of the second CAN bus without the communications of the second CAN bus being provided on the first CAN bus.

7. The refuse vehicle of claim 1, wherein the first CAN bus includes communications lines that are physically coupled with a body of the refuse vehicle, and the second CAN bus includes communication lines that are physically coupled with the chassis of the refuse vehicle.

8. A communications system for a refuse vehicle, the communications system comprising:

a first controller area network (CAN) bus for a plurality of body functions of the refuse vehicle;

a plurality of controllable elements of a body of the refuse vehicle communicably coupled with the first CAN bus;

a second CAN bus for a plurality of chassis functions of the refuse vehicle;

a plurality of controllable elements of a chassis of the refuse vehicle communicably coupled with the first CAN bus; and a telematics module communicably coupled with both the first CAN bus and the second CAN bus, the telematics module configured to monitor communications on both the first CAN bus and the second CAN bus and transmit the communications to a cloud computing system;

wherein the first CAN bus and the second CAN bus are communicatively separate and do not communicate with each other directly.

9. The communications system of claim 8, wherein the plurality of controllable elements of the body of the refuse vehicle comprise at least one of:

a side or front end lift apparatus configured to grasp and raise a waste receptacle;

a tailgate actuator;

an independent accessory system; or a lighting device.

10. The communications system of claim 8, wherein the first CAN bus is configured to receive a control input from an input device that is communicably coupled with the first CAN bus and generate a control signal for at least one of the plurality of controllable elements responsive to operation of the input device.

11. The communications system of claim 10, wherein the first CAN bus is configured to provide the control signal to the at least one of the plurality of controllable elements without the second CAN bus receiving the control signal.

12. The communications system of claim 8, wherein the second CAN bus comprises an engine control module (ECU) and a transmission control module (TCU), the second CAN bus configured to provide an engine control signal to the ECU to operate an engine of the refuse vehicle and a transmission control signal to the TCU to operate a transmission of the refuse vehicle, wherein the engine control signal is provided on the second CAN bus and not on the first CAN bus, and the transmission control signal is provided on the second CAN bus and not on the first CAN bus.

13. The communications system of claim 8, further comprising a body controller communicably coupled with both the first CAN bus and the second CAN bus, the body controller configured to receive communications on both the first CAN bus and the second CAN bus and provide control signals to the plurality of controllable elements of the first CAN bus, wherein the body controller is configured to generate the control signals for the plurality of controllable elements of the first CAN bus based on communications of the second CAN bus without the communications of the second CAN bus being provided on the first CAN bus.

14. The communications system of claim 8, wherein the first CAN bus includes communications lines that are physically coupled with a body of the refuse vehicle, and the second CAN bus includes communication lines that are physically coupled with the chassis of the refuse vehicle.

15. A method for controlling operation of a refuse vehicle, the method comprising:

providing a refuse vehicle having a first controller area network (CAN) bus for body operations of the refuse vehicle, and a second controller area network (CAN) bus for chassis operations of the refuse vehicle, wherein the first CAN bus and the second CAN bus are communicatively separate from each other;

obtaining communications from the first CAN bus and the second CAN bus at a telematics module that is communicably coupled with both the first CAN bus and the second CAN bus;

providing a control communication to a controllable element of a body of the refuse vehicle via the first CAN bus; and operating the controllable element of the body of the refuse vehicle based on the control communication.

16. The method of claim 15, wherein the refuse vehicle comprises a plurality of controllable elements communicably coupled with the first CAN bus, wherein the first CAN bus is configured to provide control communications to the plurality of controllable elements of the first CAN bus without the second CAN bus receiving the control communications.

17. The method of claim 15, wherein the second CAN bus comprises an engine control module (ECU) and a transmission control module (TCU), the second CAN bus configured to provide an engine control signal to the ECU to operate an engine of the refuse vehicle and a transmission control signal to the TCU to operate a transmission of the refuse vehicle, wherein the engine control signal is provided on the second CAN bus and not on the first CAN bus, and the transmission control signal is provided on the second CAN bus and not on the first CAN bus.

18. The method of claim 15, wherein the refuse vehicle includes a body controller communicably coupled with both the first CAN bus and the second CAN bus, the body controller configured to receive communications on both the first CAN bus and the second CAN bus and provide control signals to a plurality of controllable elements of the first CAN bus, wherein the body controller is configured to generate the control signals for the plurality of controllable elements of the first CAN bus based on communications of the second CAN bus without the communications of the second CAN bus being provided on the first CAN bus.

19. The method of claim 15, wherein the first CAN bus includes communications lines that are physically coupled with a body of the refuse vehicle, and the second CAN bus includes communication lines that are physically coupled with a chassis of the refuse vehicle.

20. The method of claim 15, wherein the body operations comprise at least one of:

operating a lift assembly to raise or lower a refuse receptacle;

operating a tailgate actuator to raise or lower a tailgate;

operating an independent accessory system; or operating a lighting system.

\* \* \* \* \*